United States Patent [19]
Chun et al.

[11] Patent Number: 5,671,024
[45] Date of Patent: Sep. 23, 1997

[54] VARIABLE LENGTH DECODING OF MOTION VECTORS

[75] Inventors: Sung Moon Chun; Geum Ock Lee, both of Seoul, Rep. of Korea

[73] Assignee: Hyundai Electronics Industries Co., Ltd., Kyoungki-do, Rep. of Korea

[21] Appl. No.: 403,978

[22] Filed: Mar. 15, 1995

[51] Int. Cl.$^6$ ........................ H04N 7/32
[52] U.S. Cl. ........................ 348/699
[58] Field of Search ........................ 348/699, 700, 348/701, 416, 402, 413, 415, 409, 401, 400, 390, 384; 341/67, 65, 76, 106; 382/236, 232; H04N 7/137

[56] References Cited

U.S. PATENT DOCUMENTS

| | | | |
|---|---|---|---|
| 5,298,991 | 3/1994 | Yagasaki et al. | 348/416 |
| 5,337,085 | 8/1994 | Lee et al. | 348/398 |
| 5,428,396 | 6/1995 | Yagasaki et al. | 348/416 |
| 5,467,136 | 11/1995 | Odaka et al. | 348/416 |
| 5,528,238 | 6/1996 | Nickerson | 341/67 |

*Primary Examiner*—Amelia Au
*Assistant Examiner*—Bryan S. Tung
*Attorney, Agent, or Firm*—Fish & Richardson, P.C.

[57] ABSTRACT

Motion vector decoding apparatus and method for converting a variable length of a motion vector into an original one using a difference component of the motion vector. The motion vector decoding apparatus comprises an X-axis motion vector component decoder for decoding an X-axis component of the motion vector in response to first and second X-axis motion vector difference components, and a Y-axis motion vector component decoder for decoding a Y-axis component of the motion vector in response to first and second Y-axis motion vector difference components. According to the present invention, a compressed video signal can be restored rapidly and accurately in a variable length decoder.

4 Claims, 4 Drawing Sheets

VARIABLE LENGTH DECODING OF MOTION VECTORS

BACKGROUND OF THE INVENTION

1. Field of the Invention

The present invention relates in general to a digital video compression technique for compressing digital video information for storage or transmission in a high definition television (referred to hereinafter as HDTV) system using a discrete cosine transform (referred to hereinafter as DCT), and more particularly to motion vector decoding apparatus and method for converting a variable length of a motion vector into an original one.

2. Description of the Prior Art

A variable length decoder (referred to hereinafter as VLD) is generally adapted to decode variable length codes (referred to hereinafter as VLCs) with a maximun operating speed of 13.4 MHz and a minimum operating speed being influenced by code runs of the VLCs.

Also, the VLD separates video information and control signals from HDTV data stored in the unit of 24 bits, to decode a slice fully. An HDTV decoder comprises four VLDs to decode four slices at a time.

However, in such a conventional VLD, a compressed video signal cannot be restored rapidly and accurately.

SUMMARY OF THE INVENTION

Therefore, the present invention has been made in view of the above problem, and it is an object of the present invention to provide motion vector decoding apparatus and method for processing (decoding) a motion vector in real-time according to an HDTV MPEG-2 algorithm to provide a high picture quality on an HDTV screen.

In accordance with one aspect of the present invention, there is provided a motion vector decoding apparatus for converting a variable length of a motion vector into an original one using a difference component of the motion vector, comprising an X-axis motion vector component decoder for decoding an X-axis component of the motion vector in response to first and second X-axis motion vector difference components; and a Y-axis motion vector component decoder for decoding a Y-axis component of the motion vector in response to first and second Y-axis motion vector difference components.

In accordance with another aspect of the present invention, there is provided a motion vector decoding method for converting a variable length of a motion vector into an original one using a difference component of the motion vector, comprising the first step of decoding an X-axis component of the motion vector in response to first and second X-axis motion vector difference components; and the second step of decoding a Y-axis component of the motion vector in response to first and second Y-axis motion vector difference components.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE PREFERRED EMBODIMENTS

In accordance with the present invention, there is provided a motion vector decoding apparatus which is capable of converting a variable length of a motion vector into an original one using a difference component of the motion vector. The motion vector decoding apparatus comprises an X-axis motion vector component decoder 10 for decoding an X-axis component of the motion vector in response to first and second X-axis motion vector difference components MVDXRA and MVDXRB, and a Y-axis motion vector component decoder 20 for decoding a Y-axis component of the motion vector in response to first and second Y-axis motion vector difference components MVDYRA and MVDYRB.

Figure 1:
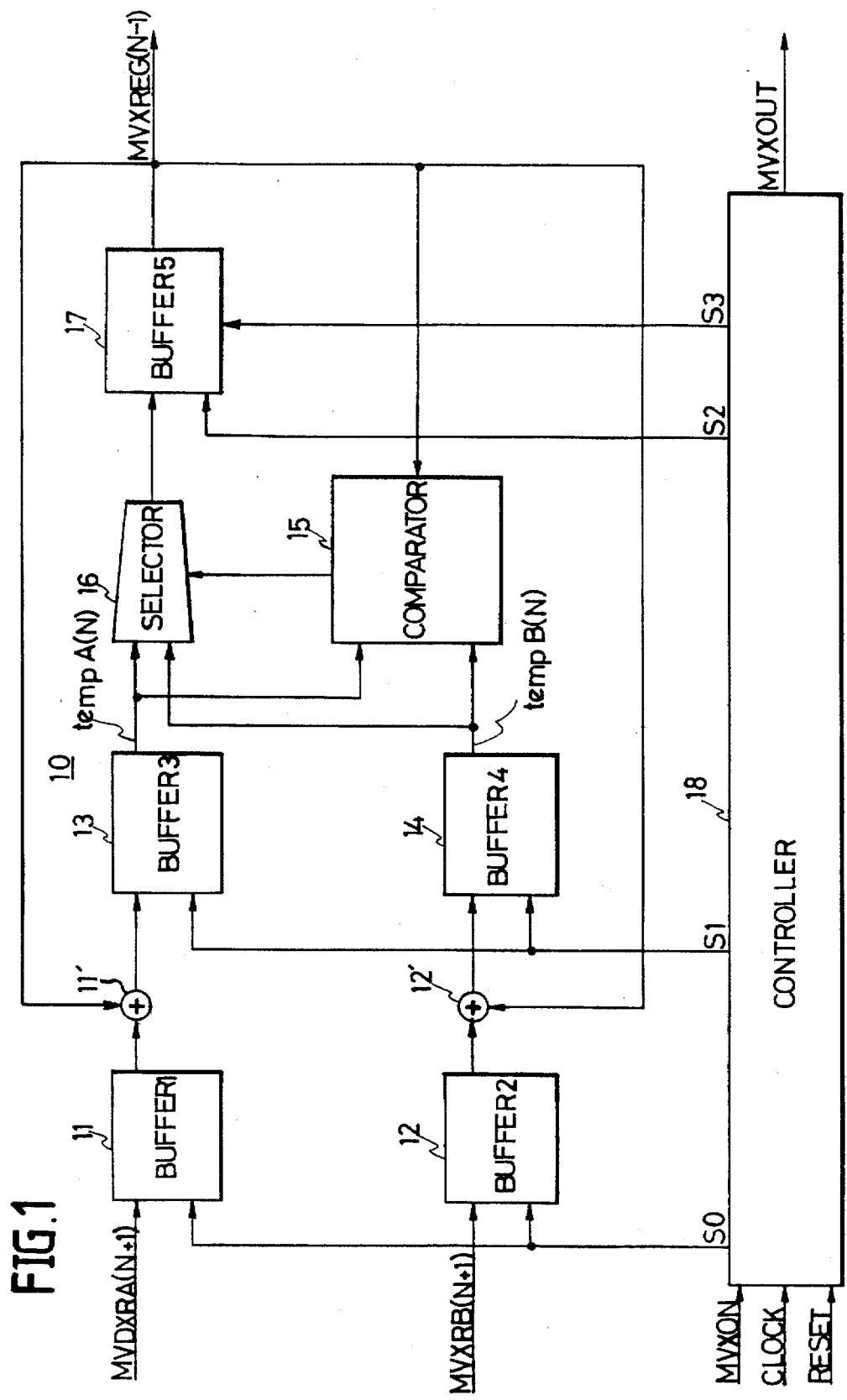
FIG. 1 is a block diagram of an X-axis motion vector component decoder in accordance with the present invention.

Referring to FIG. 1, there is shown a block diagram of the X-axis motion vector component decoder 10 in accordance with the present invention. As shown in this drawing, the X-axis motion vector component decoder 10 includes a first buffer 11 for storing temporarily the first X-axis motion vector difference component MVDXRA in response to a first control signal S0 from a controller 18, a second buffer 12 for storing temporarily the second X-axis motion vector difference component MVDXRB in response to the first control signal S0 from the controller 18, a first adder 11' for adding an output signal MVDXRA from the first buffer 11 and the X-axis motion vector component MVXREG, and a third buffer 13 for storing temporarily an output signal from the first adder 11' in response to a second control signal S1 from the controller 18.

The X-axis motion vector component decoder 10 further includes a second adder 12' for adding an output signal MVDXRB from the second buffer 12 and the X-axis motion vector component MVXREG, a fourth buffer 14 for storing temporarily an output signal from the second adder 12' in response to the second control signal S1 from the controller 18, a comparator 15 for comparing absolute values of output signals tempA and tempB from the third and fourth buffers 13 and 14 with each other and outputting an absolute X-axis motion vector component in accordance with the compared result, the absolute X-axis motion vector component having a value within the range from −31 to 31, and a selector 16 for selecting one of the output signals tempA and tempB from the third and fourth buffers 13 and 14 in response to an output signal from the comparator 15.

A fifth buffer 17 is operated responsive to third and fourth control signals S2 and S3 from the controller 18 for storing temporarily an output signal from the selector 16 and outputting the stored signal as the X-axis motion vector component MVXREG to the first and second adders 11' and 12'.

The controller 18 is adapted to generate the first to fourth control signals S0–S3 and an X-axis valid signal MVXOUT in response to a clock signal and an X-axis difference valid signal MVXON and output the generated first to fourth control signals S0–S3 to the first to fifth buffers 11–14 and 17, respectively. Also, the controller 18 outputs the X-axis valid signal MVXOUT externally synchronously with the output of the X-axis motion vector component MVXREG from the fifth buffer 17.

Figure 2:
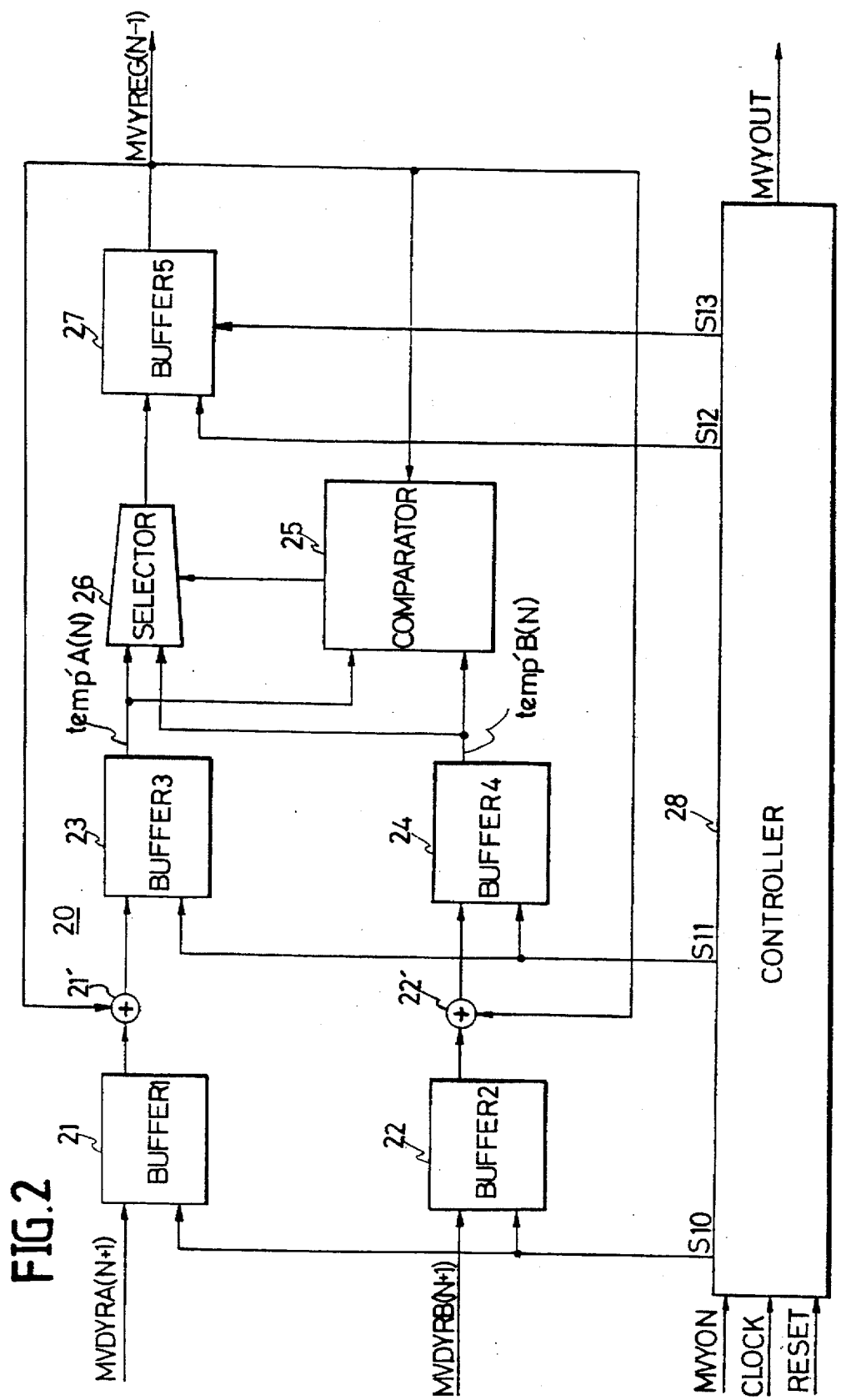
FIG. 2 is a block diagram of a Y-axis motion vector component decoder in accordance with the present invention.

Referring to FIG. 2, there is shown a block diagram of the Y-axis motion vector component decoder 20 in accordance with the present invention. As shown in this drawing, the Y-axis motion vector component decoder 20 includes a first buffer 21 for storing temporarily the first Y-axis motion vector difference component MVDYRA in response to a first control signal S10 from a controller 28, a second buffer 22 for storing temporarily the second Y-axis motion vector difference component MVDYRB in response to the first control signal S10 from the controller 28, a first adder 21' for adding an output signal MVDYRA from the first buffer 21 and the Y-axis motion vector component MVYREG, and a third buffer 23 for storing temporarily an output signal from the first adder 21' in response to a second control signal S11 from the controller 28.

The Y-axis motion vector component decoder 20 further includes a second adder 22' for adding an output signal MVDYRB from the second buffer 22 and the Y-axis motion vector component MVYREG, a fourth buffer 24 for storing temporarily an output signal from the second adder 22' in response to the second control signal S11 from the controller 28, a comparator 25 for comparing absolute values of output signals temp'A and temp'B from the third and fourth buffers 23 and 24 with each other and outputting an absolute Y-axis motion vector component in accordance with the compared result, the absolute Y-axis motion vector component having a value within the range from −8 to 7, and a selector 26 for selecting one of the output signals temp'A and temp'B from the third and fourth buffers 23 and 24 in response to an output signal from the comparator 25.

A fifth buffer 27 is operated responsive to third and fourth control signals S12 and S13 from the controller 28 for storing temporarily an output signal from the selector 26 and outputting the stored signal as the Y-axis motion vector component MVYREG to the first and second adders 21' and 22'.

The controller 28 is adapted to generate the first to fourth control signals S10–S13 and a Y-axis valid signal MVYOUT in response to a clock signal and a Y-axis difference valid signal MVYON and output the generated first to fourth control signals S10–S13 to the first to fifth buffers 21–24 and 27, respectively. Also, the controller 28 outputs the Y-axis valid signal MVYOUT externally synchronously with the output of the Y-axis motion vector component MVYREG from the fifth buffer 27.

The operation of the motion vector decoding apparatus with the above-mentioned construction in accordance with the present invention will hereinafter be described in detail.

The X-axis motion vector component decoder 10 is a circuit for calculating the absolute X-axis motion vector component on the basis of the X-axis motion vector difference components. Similarly, the Y-axis motion vector component decoder 20 is a circuit for calculating the absolute Y-axis motion vector component on the basis of the Y-axis motion vector difference components.

First, the operation of the X-axis motion vector component decoder 10 will hereinafter be described with reference to FIG. 1.

The first and second X-axis motion vector difference components MVDXRA and MVDXRB are applied to the first and second buffers 11 and 12 in the unit of 7 bits, respectively.

Then, the first and second X-axis motion vector difference components MVDXRA and MVDXRB from the first and second buffers 11 and 12 are supplied in common to the selector 16 and the comparator 15, respectively, through the first and second adders 11' and 12' and the third and fourth buffers 13 and 14.

The comparator 15 discriminates whether the first and second X-axis motion vector components tempA and tempB from the third and fourth buffers 13 and 14 are present within a desired range. The selector 16 selects one of the first and second X-axis motion vector components tempA and tempB from the third and fourth buffers 13 and 14 in accordance with the discriminated result from the comparator 15.

Namely, the absolute X-axis motion vector component from the comparator 15 has a value within the following range:

−31≦absolute X-axis motion vector component≦31

The above range is an actual motion search interval of the X-axis motion vector component decoder 10 and the X-axis motion vector difference components have values within the following range:

−62≦X-axis motion vector difference components≦62

Therefore, the comparator 15 discriminates whether the first and second X-axis motion vector components tempA and tempB from the third and fourth buffers 13 and 14 are present within the range from −31 to 31. The selector 16 selects one of the first and second X-axis motion vector components tempA and tempB from the third and fourth buffers 13 and 14 in accordance with the discriminated result from the comparator 15. Then, the selector 16 outputs the selected X-axis motion vector component to the fifth buffer 17.

The output signal MVXREG from the fifth buffer 17 is a previous X-axis motion vector component and the first and second output signals MVDXRA and MVDXRB from the first and second buffers 11 and 12 are decoded X-axis motion vector components. The first and second X-axis motion vector components tempA and tempB from the third and fourth buffers 13 and 14 are current X-axis motion vector components.

Namely, the first and second current X-axis motion vector components tempA and tempB from the third and fourth buffers 13 and 14 can be expressed as follows:

current X-axis motion vector components tempA and tempB

= previous X-axis motion vector component MVXREG

+ decoded X-axis motion vector components MVDXRA and MVDXRB

The above operation is repeatedly performed.

Provided that the first and second decoded X-axis motion vector components MVDXRA and MVDXRB from the first and second buffers 11 and 12 are (N+1)th X-axis motion vector components, the first and second current X-axis motion vector components tempA and tempB from the third and fourth buffers 13 and 14 are Nth X-axis motion vector components and the previous X-axis motion vector component MVXREG from the fifth buffer 17 is an (N−1)th X-axis motion vector component.

The X-axis difference valid signal MVXON is applied to the controller 18 to indicate the input of the first and second X-axis motion vector difference components MVDXRA and MVDXRB. In response to the X-axis difference valid signal MVXON, the controller 18 counts the clock signal to generate the first to fourth control signals S0–S3. Then, the controller 18 outputs the generated first to fourth control signals S0–S3 to the first to fifth buffers 11–14 and 17 to control the storage states thereof.

Namely, upon the input of the X-axis difference valid signal MVXON, the first control signal S0 from the controller 18 is applied as an operating signal to the first and second buffers 11 and 12 synchronously with a first clock. The second control signal S1 from the controller 18 is applied as an operating signal to the third and fourth buffers 13 and 14 synchronously with a second clock. Similarly, the third and fourth control signals S2 and S3 from the controller 18 are applied as operating signals to the fifth buffer 17 synchronously with the subsequent clocks.

In this manner, the controller 18 generates the first to fourth control signals S0–S3 by steps according to the clock signal. Also, the controller 18 outputs the X-axis valid signal MVXOUT externally synchronously with the output of the X-axis motion vector component MVXREG from the fifth buffer 17. The following table 1 shows an X-axis motion vector component VLC table.

TABLE 1

| R = 0 | R = 1 | R = 1 | R = 0 | VLC |
|---|---|---|---|---|
| −31 | −32 | 31 | 32 | 0000 0011 001 |
| −29 | −30 | 33 | 34 | 0000 0011 011 |
| −27 | −28 | 35 | 36 | 0000 0011 101 |
| −25 | −26 | 37 | 38 | 0000 0011 111 |
| −23 | −24 | 39 | 40 | 0000 0100 001 |
| −21 | −22 | 41 | 42 | 0000 0100 011 |
| −19 | −20 | 43 | 44 | 0000 0100 11 |
| −17 | −18 | 45 | 46 | 0000 0101 01 |
| −15 | −16 | 47 | 48 | 0000 0101 |
| −13 | −14 | 49 | 50 | 0000 0111 |
| −11 | −12 | 51 | 52 | 0000 1001 |
| −9 | −10 | 53 | 54 | 0000 1011 |
| −7 | −8 | 55 | 56 | 0000 111 |
| −5 | −6 | 57 | 58 | 0001 1 |
| −3 | −4 | 59 | 60 | 0011 |
| −1 | −2 | 61 | 62 | 011 |
| 0 | 0 | 0 | 0 | 1 |
| 1 | 2 | −61 | −62 | 010 |
| 3 | 4 | −59 | −60 | 0010 |
| 5 | 6 | −57 | −58 | 0001 0 |
| 7 | 8 | −55 | −56 | 0000 110 |
| 9 | 10 | −53 | −54 | 0000 1010 |
| 11 | 12 | −51 | −52 | 0000 1000 |
| 13 | 14 | −49 | −50 | 0000 0110 |
| 15 | 16 | −47 | −48 | 0000 0101 10 |
| 17 | 18 | −45 | −46 | 0000 0101 00 |
| 19 | 20 | −43 | −44 | 0000 0100 10 |
| 21 | 22 | −41 | −42 | 0000 0101 010 |
| 23 | 24 | −39 | −40 | 0000 0100 000 |
| 25 | 26 | −37 | −38 | 0000 0011 110 |
| 27 | 28 | −35 | −36 | 0000 0011 100 |
| 29 | 30 | −33 | −34 | 0000 0011 010 |

In the above table 1, one case of R=0 and R=1 shows the first X-axis motion vector difference component MVDXRA and the other case of R=1 and R=0 shows the second X-axis motion vector difference component MVDXRB.

Figure 3:
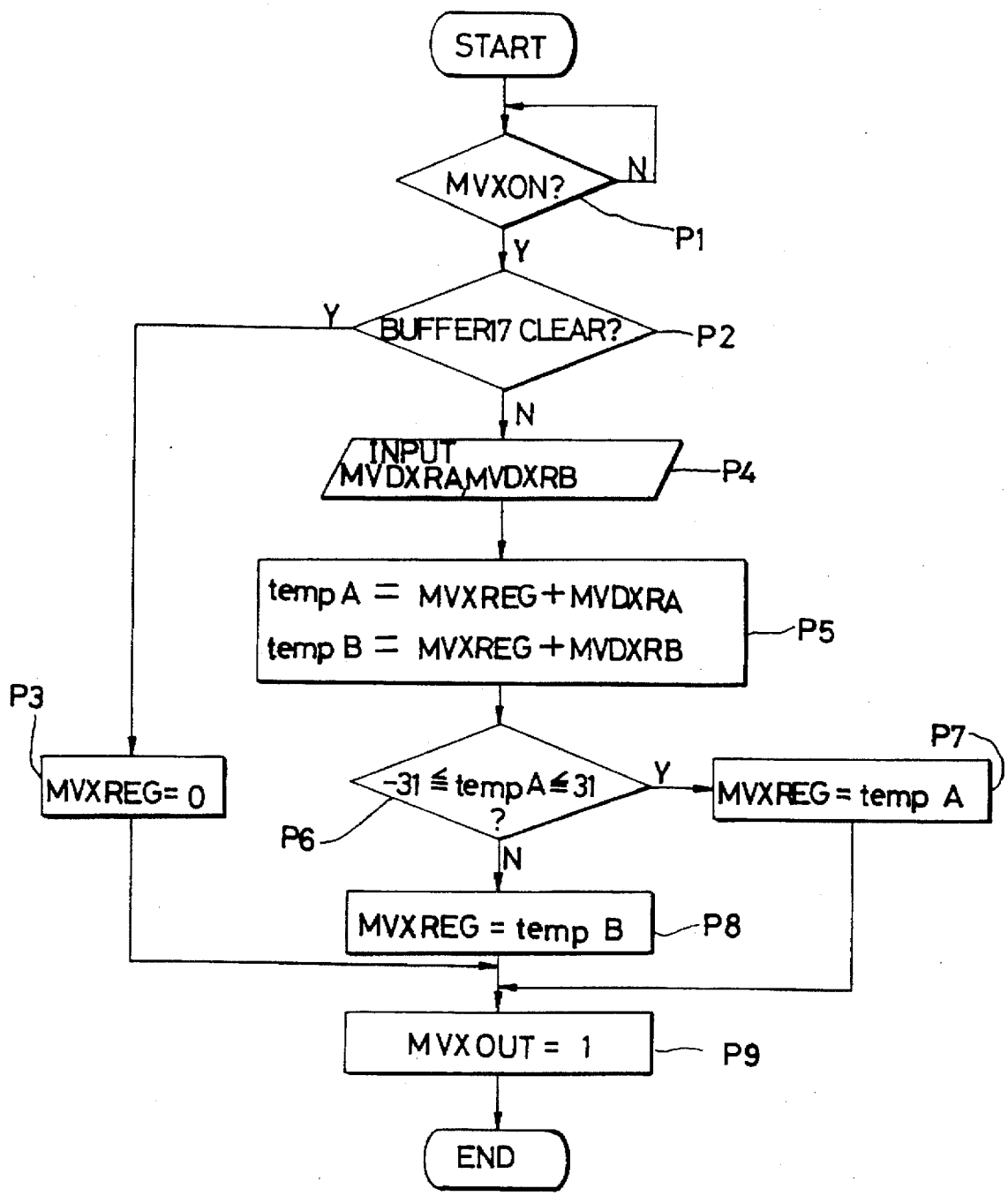
FIG. 3 is a flowchart illustrating an operation of the X-axis motion vector component decoder in FIG. 1 in accordance with the present invention.

FIG. 3 is a flowchart illustrating the operation of the X-axis motion vector component decoder 10 in FIG. 1 in accordance with the present invention. First, the controller 18 checks at the step P1 whether the X-axis difference valid signal MVXON has been inputted, to check whether the first and second X-axis motion vector difference components MVDXRA and MVDXRB have been inputted. Here, the first and second X-axis motion vector difference components MVDXRA and MVDXRB are the (N+1)th X-axis motion vector components. If it is checked at the step P1 that the X-axis difference valid signal MVXON has not been inputted, the controller 18 determines that the first and second X-axis motion vector difference components MVDXRA and MVDXRB have not been inputted and thus continues to check whether the X-axis difference valid signal MVXON has been inputted. On the contrary, if it is checked at the step P1 that the X-axis difference valid signal MVXON has been inputted, the controller 18 checks at the step P2 whether the fifth buffer 17 is in a clear state. When it is checked at the step P2 that the fifth buffer 17 is in the clear state, the controller 18 sets the X-axis motion vector component MVXREG from the fifth buffer 17 to 0 at the step P3. In this case, the controller 18 sets the X-axis valid signal MVXOUT to 1 synchronously with the output of the X-axis motion vector component MVXREG from the fifth buffer 17 at the step P9.

On the contrary, in the case where the fifth buffer 17 is not in the clear state at the step P2, the first and second X-axis motion vector difference components MVDXRA and MVDXRB are applied to the first and second buffers 11 and 12, respectively, at the step P4. At the step P5, the first and second X-axis motion vector difference components MVDXRA and MVDXRB are temporarily stored into the first and second buffers 11 and 12, respectively, in response to the first control signal S0 from the controller 18. Then, the first and second X-axis motion vector difference components MVDXRA and MVDXRB from the first and second buffers 11 and 12 are added to the X-axis motion vector component MVXREG from the fifth buffer 17 by the first and second adders 11' and 12', respectively, and then outputted as the first and second Nth X-axis motion vector components tempA and tempB through the third and fourth buffers 13 and 14, respectively. The comparator 15 checks at the step P6 whether the first Nth X-axis motion vector component tempA from the third buffer 13 is within the range from −31 to 31. If it is checked at the step P6 that the first Nth X-axis motion vector component tempA from the third buffer 13 is within the range from −31 to 31, the selector 16 selects the first Nth X-axis motion vector component tempA from the third buffer 13 and outputs the selected first Nth X-axis motion vector component tempA to the fifth buffer 17 at the step P7. Then, the fifth buffer 17 outputs the first Nth X-axis motion vector component tempA from the selector 16 as the (N−1)th X-axis motion vector component MVXREG.

If the first Nth X-axis motion vector component tempA from the third buffer 13 is not within the range from −31 to 31 at the step P6, the selector 16 selects the second Nth X-axis motion vector component tempB from the fourth buffer 14 and outputs the selected second Nth X-axis motion vector component tempB to the fifth buffer 17 at the step P8. Then, the fifth buffer 17 outputs the second Nth X-axis motion vector component tempB from the selector 16 as the (N−1)th X-axis motion vector component MVXREG. The controller 18 sets the X-axis valid signal MVXOUT to 1 synchronously with the output of the (N−1)th X-axis motion vector component MVXREG from the fifth buffer 17 at the step P9.

Then, the operation of the Y-axis motion vector component decoder 20 will hereinafter be described with reference to FIG. 2.

The operation of the Y-axis motion vector component decoder 20 is substantially the same as that of the X-axis motion vector component decoder 10 in FIG. 1, with a few exceptions. Namely, the operations of the first to fifth buffers 21–24 and 27 are the same as those of the first to fifth buffers 11–14 and 17, respectively. The operations of the first and second adders 21' and 22' are the same as those of the first and second adders 11' and 12', respectively. Also, the operation of the selector 26 is the same as that of the selector 16. Further, the operation of the controller 28 is the same as that of the controller 18.

By the way, the first and second Y-axis motion vector difference components MVDYRA and MVDYRB are applied to the first and second buffers 21 and 22 in the unit of 5 bits, respectively, whereas the first and second X-axis motion vector difference components MVDXRA and MVDXRB are applied to the first and second buffers 11 and 12 in the unit of 7 bits, respectively. Also, the operation of the comparator 25 is different from that of the comparator 15. Namely, the absolute Y-axis motion vector component from the comparator 25 has a value within the following range:

−8 ≦ absolute Y-axis motion vector component ≦ 7

The above range is an actual motion search interval of the Y-axis motion vector component decoder 20 and the Y-axis motion vector difference components have values within the following range:

−15 ≦ Y-axis motion vector difference components ≦ 15

Therefore, the comparator 25 discriminates whether the first and second Y-axis motion vector components temp'A and temp'B from the third and fourth buffers 23 and 24 are present within the range from −8 to 7. The selector 26 selects one of the first and second Y-axis motion vector components temp'A and temp'B from the third and fourth buffers 23 and 24 in accordance with the discriminated result from the comparator 25. Then, the selector 26 outputs the selected Y-axis motion vector component to the fifth buffer 27.

The following table 2 shows a Y-axis motion vector component VLC table.

TABLE 2

| MVDY | | VLC | |
| --- | --- | --- | --- |
| −8 | 8 | 0000 0101 | 11 |
| −7 | 9 | 0000 0111 | |
| −6 | 10 | 0000 1001 | |
| −5 | 11 | 0001 1011 | |
| −4 | 12 | 0000 111 | |
| −3 | 13 | 0001 1 | |
| −2 | 14 | 0011 | |
| −1 | 15 | 011 | |
| 0 | 0 | 1 | |
| 1 | −15 | 010 | |
| 2 | −14 | 0010 | |
| 3 | −13 | 0001 0 | |
| 4 | −12 | 0000 110 | |
| 5 | −11 | 0000 1010 | |
| 6 | −10 | 0000 1000 | |
| 7 | −9 | 0000 0110 | |

In the above table 2, MVDY shows the first and second Y-axis motion vector difference components MVDYRA and MVDYRB.

Figure 4:
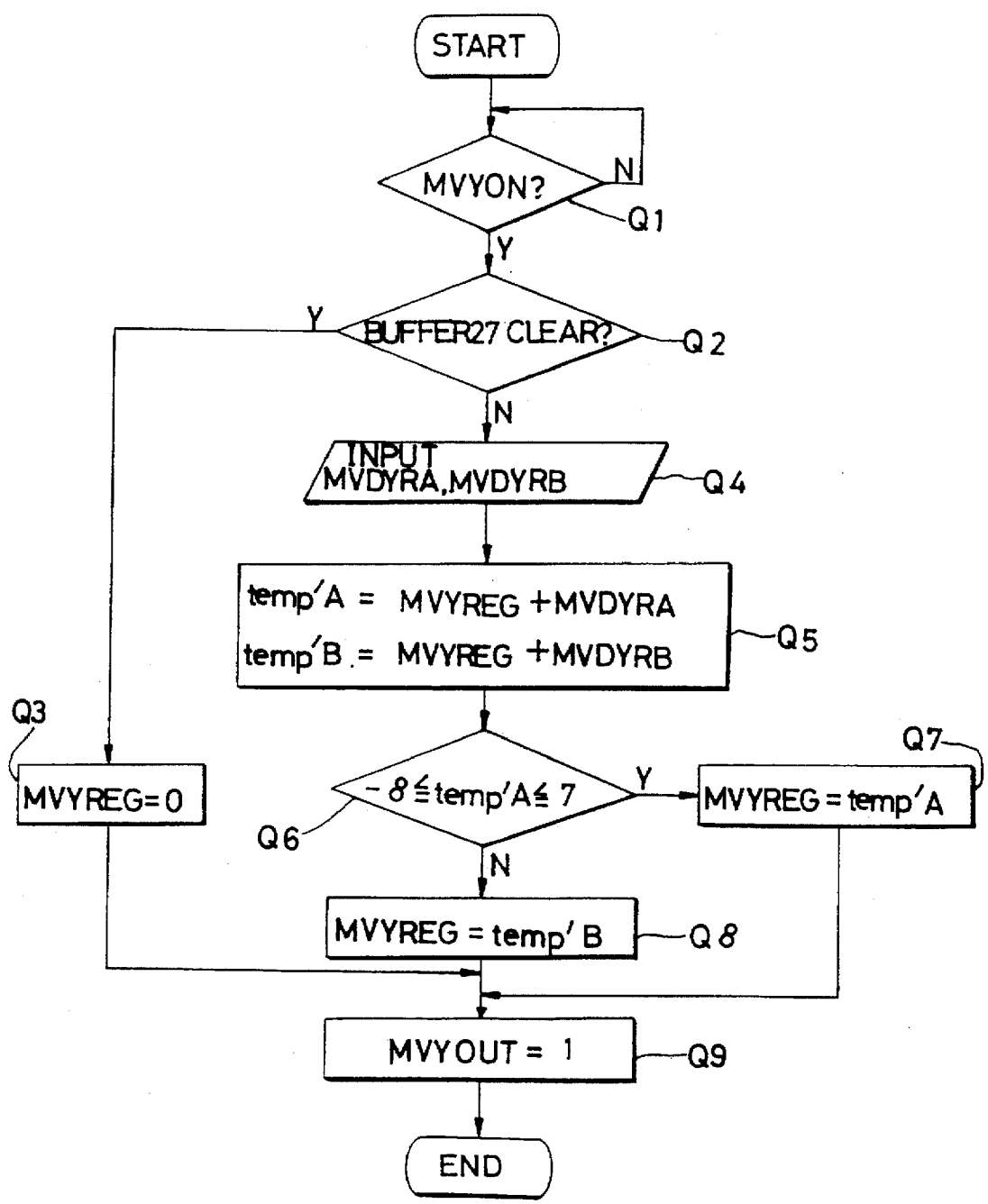
FIG. 4 is a flowchart illustrating an operation of the Y-axis motion vector component decoder in FIG. 2 in accordance with the present invention.

FIG. 4 is a flowchart illustrating the operation of the Y-axis motion vector component decoder 20 in FIG. 2 in accordance with the present invention. First, the controller 28 checks at the step Q1 whether the Y-axis difference valid signal MVYON has been inputted, to check whether the first and second Y-axis motion vector difference components MVDYRA and MVDYRB have been inputted. Here, the first and second Y-axis motion vector difference components MVDYRA and MVDYRB are the (N+1)th Y-axis motion vector components. If it is checked at the step Q1 that the Y-axis difference valid signal MVYON has not been inputted, the controller 28 determines that the first and second Y-axis motion vector difference components MVDYRA and MVDYRB have not been inputted and thus continues to check whether the Y-axis difference valid signal MVYON has been inputted. On the contrary, if it is checked at the step Q1 that the Y-axis difference valid signal MVYON has been inputted, the controller 28 checks at the step Q2 whether the fifth buffer 27 is in a clear state. When it is checked at the step Q2 that the fifth buffer 27 is in the clear state, the controller 28 sets the Y-axis motion vector component MVYREG from the fifth buffer 27 to 0 at the step Q3. In this case, the controller 28 sets the Y-axis valid signal MVYOUT to 2 synchronously with the output of the Y-axis motion vector component MVYREG from the fifth buffer 27 at the step Q9.

On the contrary, in the case where the fifth buffer 27 is not in the clear state at the step Q2, the first and second Y-axis motion vector difference components MVDYRA and MVDYRB are applied to the first and second buffers 21 and 22, respectively, at the step Q4. At the step Q5, the first and second Y-axis motion vector difference components MVDYRA and MVDYRB are temporarily stored into the first and second buffers 21 and 22, respectively, in response to the first control signal S0 from the controller 28. Then, the first and second Y-axis motion vector difference components MVDYRA and MVDYRB from the first and second buffers 21 and 22 are added to the Y-axis motion vector component MVYREG from the fifth buffer 27 by the first and second adders 21' and 22', respectively, and then outputted as the first and second Nth Y-axis motion vector components temp'A and temp'B through the third and fourth buffers 23 and 24, respectively. The comparator 25 checks at the step Q6 whether the first Nth Y-axis motion vector component temp'A from the third buffer 23 is within the range from −8 to 7. If it is checked at the step Q6 that the first Nth Y-axis motion vector component temp'A from the third buffer 23 is within the range from −8 to 7, the selector 26 selects the first Nth Y-axis motion vector component temp'A from the third buffer 23 and outputs the selected first Nth Y-axis motion vector component temp'A to the fifth buffer 27 at the step Q7. Then, the fifth buffer 27 outputs the first Nth Y-axis motion vector component temp'A from the selector 26 as the (N−1)th Y-axis motion vector component MVYREG.

If the first Nth Y-axis motion vector component temp'A from the third buffer 23 is not within the range from −8 to 7 at the step Q6, the selector 26 selects the second Nth Y-axis motion vector component temp'B from the fourth buffer 24 and outputs the selected second Nth Y-axis motion vector component temp'B to the fifth buffer 27 at the step Q8. Then, the fifth buffer 27 outputs the second Nth Y-axis motion vector component temp'B from the selector 26 as the (N−1)th Y-axis motion vector component MVYREG. The controller 28 sets the Y-axis valid signal MVYOUT to 2 synchronously with the output of the (N−1)th Y-axis motion vector component MVYREG from the fifth buffer 27 at the step Q9.

As apparent from the above description, according to the present invention, the motion vector decoding apparatus can convert the variable length of the motion vector into the original one using the difference component of the motion vector. Therefore, a compressed video signal can be restored rapidly and accurately in a VLD.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A motion vector decoding apparatus for converting a variable length coded representation of a motion vector into an original vector using a difference component of the motion vector, comprising:

X-axis motion vector component decoding means for decoding an X-axis component of the motion vector in response to first ad second X-axis motion vector difference components, said X-axis motion vector component decoding means includes:

a first buffer for storing temporarily the first X-axis motion vector difference component in response to a first control signal;

a second buffer for storing temporarily the second X-axis motion vector difference component in response to the first control signal;

a first adder for adding an output signal from said first buffer and the X-axis motion vector component;

a third buffer for storing temporarily an output signal from said first adder in response to a second control signal;

a second adder for adding an output signal from said second buffer and the X-axis motion vector component;

a fourth buffer for storing temporarily an output signal from said second adder in response to the second control signal;

a comparator for comparing absolute values of output signals from said third and fourth buffers with each other and outputting an absolute X-axis motion vector component in accordance with the compared result, the absolute X-axis motion vector component having a value within the range from −31 to 31;

a selector for selecting one of the output signals from said third and fourth buffers in response to an output signal from said comparator;

a fifth buffer responsive to third and fourth control signals for storing temporarily an output signal from said selector and outputting the stored signal as the X-axis motion vector component to said first and second adders; and a controller for generating the first to fourth control signals and an X-axis valid signal in response to a clock signal and an X-axis difference valid signal and outputting the generated first to fourth control signals to said first to fifth buffers, said controller outputting the X-axis valid signal externally synchronously with the output of the X-axis motion vector component from said fifth buffer; and Y-axis motion vector component decoding means for decoding a Y-axis component of the motion vector in response to first and second Y-axis motion vector difference components.

2. A motion vector decoding apparatus for converting a variable length coded representation of a motion vector into an original vector using a difference component of the motion vector, comprising:

X-axis motion vector component decoding means for decoding an X-axis component of the motion vector in response to first and second X-axis motion vector difference components; and Y-axis motion vector component decoding means for decoding a Y-axis component of the motion vector in response to first and second Y-axis motion vector difference components, said Y-axis motion vector component decoding means includes:

a first buffer for storing temporarily the first Y-axis motion vector difference component in response to a first control signal;

a second buffer for storing temporarily the second Y-axis motion vector difference component in response to the first control signal;

a first adder for adding an output signal from said first buffer and the Y-axis motion vector component;

a third buffer for storing temporarily an output signal from said first adder in response to a second control signal;

a second adder for adding an output signal from said second buffer and the Y-axis motion vector component;

a fourth buffer for storing temporarily an output signal from said second adder in response to the second control signal;

a comparator for comparing absolute values of output signals from said third and fourth buffers with each other and outputting an absolute Y-axis motion vector component in accordance with the compared result, the absolute Y-axis motion vector component having a value within the range from −8 to 7;

a selector for selecting one of the output signals from said third and fourth buffers in response to an output signal from said comparator;

a fifth buffer responsive to third and fourth control signals for storing temporarily an output signal from said selector and outputting the stored signal as the Y-axis motion vector component to said first and second adders; and a controller for generating the first to fourth control signals and a Y-axis valid signal in response to a clock signal and a Y-axis difference valid signal and outputting the generated first to fourth control signals to said first to fifth buffers, said controller outputting the Y-axis valid signal externally synchronously with the output of the Y-axis motion vector component from said fifth buffer.

3. A motion vector decoding method for converting a variable length coded representation of a motion vector into an original vector using a difference component of the motion vector, comprising the steps of:

(a) decoding an X-axis component of the motion vector in response to first and second X-axis motion vector difference components, decoding the X-axis motion vector component includes the steps of:

(a-1) checking whether an X-axis difference valid signal has been inputted, to check whether the first and second X-axis motion vector difference components have been inputted, the first and second X-axis motion vector difference components being (N+1)th X-axis motion vector components;

(a-2) checking whether a first buffer is in a clear state, if it is checked at said step (a-1) that the X-axis difference valid signal has been inputted;

(a-3) setting an output of said first buffer to 0 if it is checked at said step (a-2) that said first buffer is in the clear state and allowing said first buffer to output the X-axis motion vector component;

(a-4) applying the first and second X-axis motion vector difference components to second and third buffers, respectively, if it is checked at said step (a-2) that said first buffer is not in the clear state;

(a-5) storing temporarily the first and second X-axis motion vector difference components into said second and third buffers, respectively, adding the stored first and second X-axis motion vector difference components to the X-axis motion vector component from said first buffer, and then outputting the respective sums as first and second Nth X-axis motion vector components through fourth and fifth buffers, respectively;

(a-6) allowing a comparator to check whether the first Nth X-axis motion vector component from said fourth buffer is within the range from −31 to 31;

(a-7) allowing a selector to select the first Nth X-axis motion vector component from said fourth buffer and to output the selected first Nth X-axis motion vector component to said first buffer, if it is checked at said step (a-6) that the first Nth X-axis motion vector component from said fourth buffer is within the range from −31 to 31, and allowing said first buffer to output the first Nth X-axis motion vector component from said selector as an (N−1)th X-axis motion vector component;

(a-8) allowing said selector to select the second Nth X-axis motion vector component from said fifth buffer and to output the selected second Nth X-axis motion vector component to said first buffer, if it is checked at said step (a-6) that the first Nth X-axis motion vector component from said fourth buffer is not within the range from −31 to 31, and allowing said first buffer to output the second Nth X-axis motion vector component from said selector as the (N−1)th X-axis motion vector component; and (a-9) setting an X-axis valid signal to 1 synchronously with the output of said first buffer; and (b) decoding a Y-axis component of the motion vector in response to first and second Y-axis motion vector difference components.

4. A motion vector decoding method as for converting a variable length coded representation of a motion vector into an original vector using a difference component of the motion vector, comprising the steps of:

(a) decoding an X-axis component of the motion vector in response to first and second X-axis motion vector difference component; and (b) decoding a Y-axis component of the motion vector in response to first and second Y-axis motion vector difference components, decoding the Y-axis motion vector component includes the steps of:

(b-1) checking whether a Y-axis difference valid signal has been inputted, to check whether the first and second Y-axis motion vector difference components have been inputted, the first and second Y-axis motion vector difference components being (N+1)th Y-axis motion vector components;

(b-2) checking whether a first buffer is in a clear state, if it is checked at said step (b-1) that the Y-axis difference valid signal has been inputted;

(b-3) setting an output of said first buffer to 0 if it is checked at said step (b-2) that said first buffer is in the clear state and allowing said first buffer to output the Y-axis motion vector component;

(b-4) applying the first and second Y-axis motion vector difference components to second and third buffers, respectively, if it is checked at said step (b-2) that said first buffer is not in the clear state;

(b-5) storing temporarily the first and second Y-axis motion vector difference components into said second and third buffers, respectively, adding the stored first and second Y-axis motion vector difference components to the Y-axis motion vector component from said first buffer, and then outputting the respective sums as first and second Nth Y-axis motion vector components through fourth and fifth buffers, respectively;

(b-6) allowing a comparator to check whether the first Nth Y-axis motion vector component from said fourth buffer is within the range from −8 to 7;

(b-7) allowing a selector to select the first Nth Y-axis motion vector component from said fourth buffer and to output the selected first Nth Y-axis motion vector component to said first buffer, if it is checked at said step (b-6) that the first Nth Y-axis motion vector component from said fourth buffer is within the range from −8 to 7, and allowing said first buffer to output the first Nth Y-axis motion vector component from said selector as an (N−1)th Y-axis motion vector component;

(b-8) allowing said selector to select the second Nth Y-axis motion vector component from said fifth buffer and to output the selected second Nth Y-axis motion vector component to said first buffer, if it is checked at said step (b-6) that the first Nth Y-axis motion vector component from said fourth buffer is not within the range from −8 to 7, and allowing said first buffer to output the second Nth Y-axis motion vector component from said selector as the (N−1)th Y-axis motion vector component; and (b-9) setting a Y-axis valid signal to 1 synchronously with the output of said first buffer.

* * * * *